No. 832,016. PATENTED SEPT. 25, 1906.
J. G. HOFFKEN.
BROODER HEATER.
APPLICATION FILED JULY 21, 1905.

2 SHEETS—SHEET 1.

WITNESSES
INVENTOR
JERRY G. HOFFKEN
BY
HIS ATTORNEYS

No. 832,016. PATENTED SEPT. 25, 1906.
J. G. HOFFKEN.
BROODER HEATER.
APPLICATION FILED JULY 21, 1905.

2 SHEETS—SHEET 2.

WITNESSES
M. M. Innis
C. Macnamara

INVENTOR
JERRY G. HOFFKEN
BY Paul & Paul
HIS ATTORNEYS

THE NORRIS PETERS CO., WASHINGTON, D. C.

UNITED STATES PATENT OFFICE.

JERRY G. HOFFKEN, OF MINNEAPOLIS, MINNESOTA, ASSIGNOR TO G. N. BURG, OF MINNEAPOLIS, MINNESOTA.

BROODER-HEATER.

No. 832,016.  Specification of Letters Patent.  Patented Sept. 25, 1906.

Application filed July 21, 1905. Serial No. 270,631.

*To all whom it may concern:*

Be it known that I, JERRY G. HOFFKEN, of Minneapolis, Hennepin county, Minnesota, have invented certain new and useful Improvements in Brooder-Heaters, of which the following is a specification.

My invention relates to chicken-brooders; and the object of the invention is to provide improved means for heating the same, removing the foul air, and providing a more perfect circulation of pure warm air through the brooder.

The invention consists generally in various constructions and combinations, all as hereinafter described, and particularly pointed out in the claims.

Figure 1:
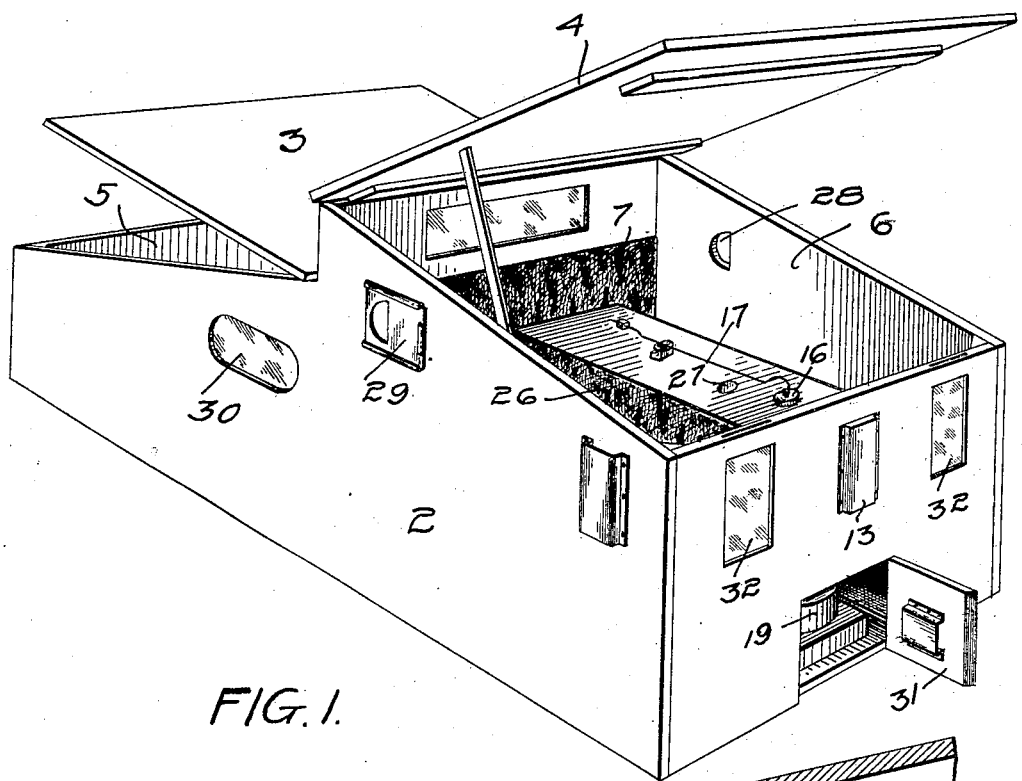
Figure 2:
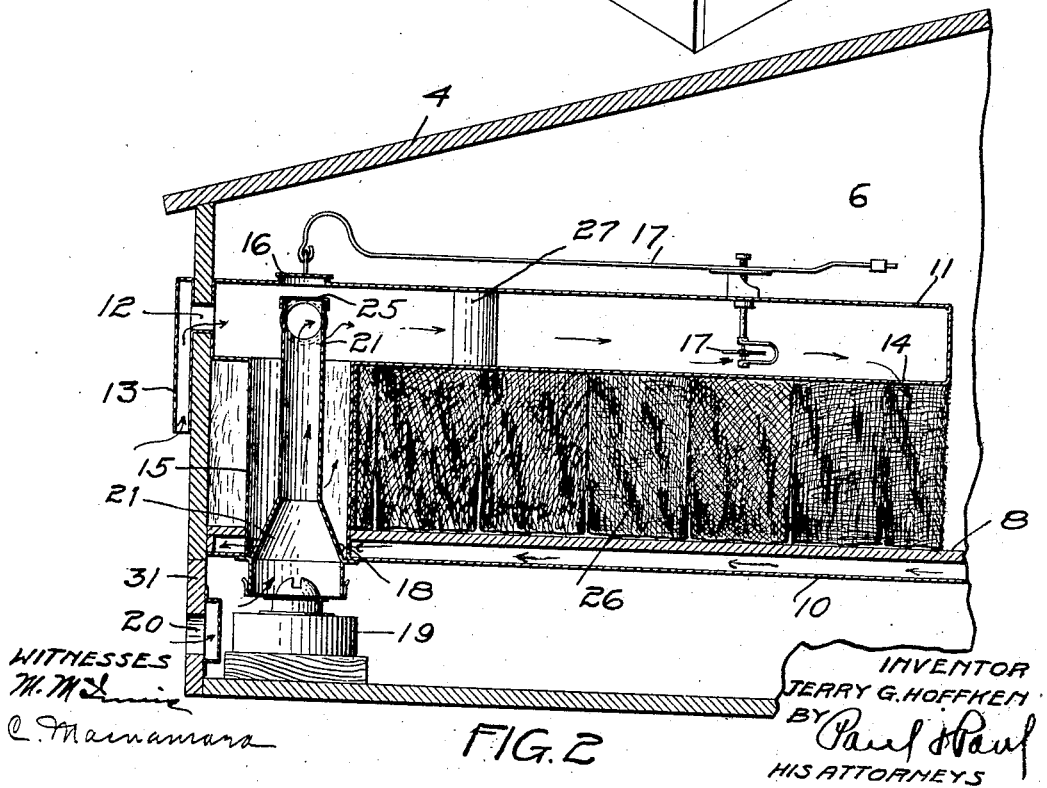
Figure 3:
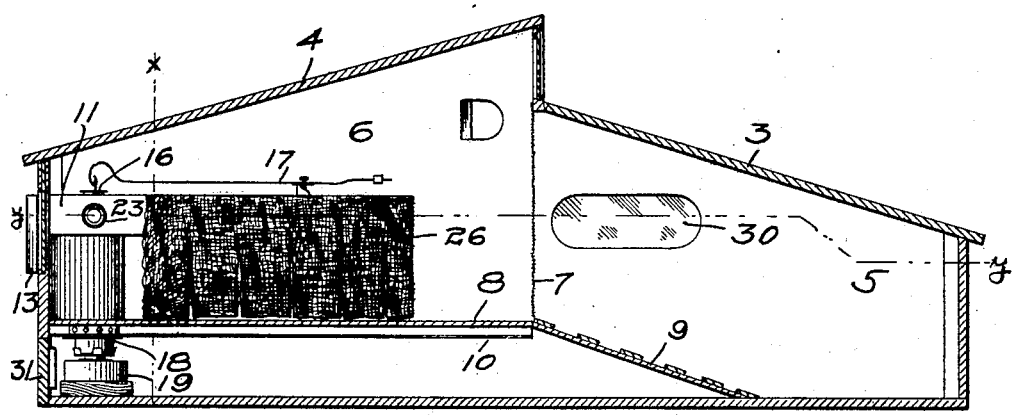
Figure 4:
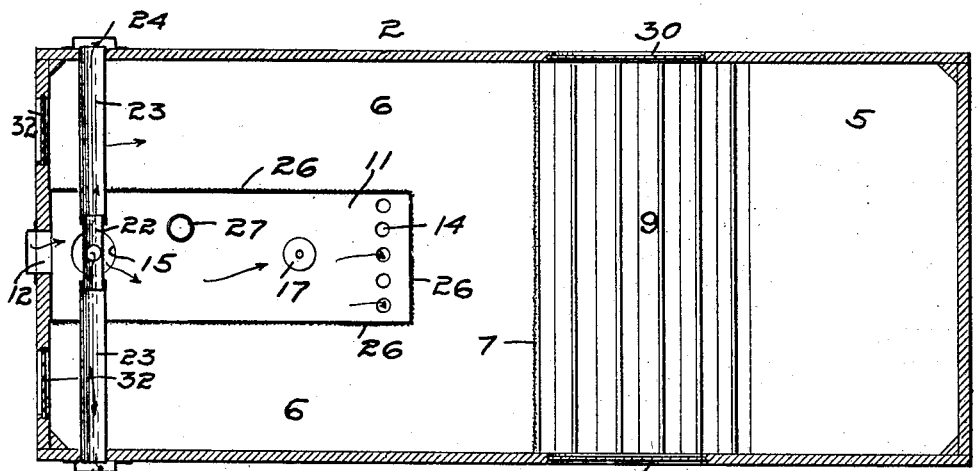
Figure 5:
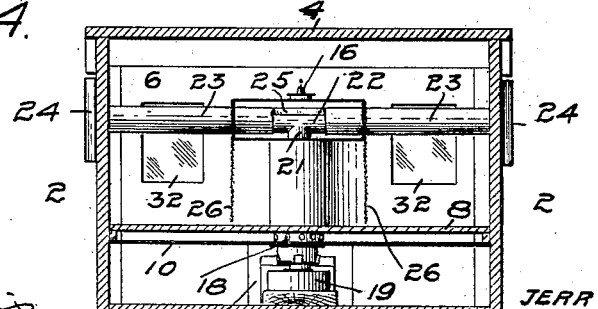

In the accompanying drawings, forming part of this specification, Figure 1 is a perspective view of a brooder embodying my invention. Fig. 2 is a vertical sectional view through the forward portion of the brooder, showing in detail the heating means employed. Fig. 3 is a similar view throughout the entire length of the brooder. Fig. 4 is a horizontal sectional view on the line $y$ $y$ of Fig. 3. Fig. 5 is a transverse sectional view on the line $x$ $x$ of Fig. 3.

In the drawings, 2 represents the casing or box of the brooder having hinged covers or doors 3 and 4, the former covering the feeding-chamber 5 and the latter the artificially-heated chamber 6, separated from the chamber 5 by a curtain 7, of felt or other suitable material, which the chickens can push to one side in passing from one chamber to the other. 8 is a floor arranged horizontally within the chamber 6, to which an inclined plate 9 leads from the feeding-chamber. Below the floor 8 and spaced therefrom is a plate 10, preferably of sheet metal, extending with said floor entirely across the chamber 6 from one side wall of the brooder to the other. Above the middle portion of the floor 8 is a chamber 11, preferably of sheet metal, communicating at its forward end through a port 12 in the front wall of the brooder with an air-duct 13, through which fresh air is admitted to said chamber. The rear lower wall of the chamber 11 is provided with a series of holes 14, through which the heated air escapes into the chamber 6. A vertically-arranged pipe 15, having open ends, projects through a hole in the floor 8 and has its lower end resting upon the plate 10 and its upper end communicating with the chamber 11. Above this pipe the chamber 11 is provided with a cap 16, adapted to be raised or lowered by a thermostatic regulating device 17. A series of perforations 18 are provided in the pipe 15, communicating with the space between the floor 8 and the plate 10.

Below the plate 10 and the pipe 15 is a lamp 19, supplied with air through a hole 20 in the wall of the brooder and having a chimney 21 within the pipe 15 and projecting up into the chamber 11. A T 22 is provided on the upper end of the chimney 21 and has its ends inserted into pipes 23, projecting horizontally therefrom across the chamber 6 and through the side walls of the brooder, being covered on the outside by hoods 24, which prevent the wind from blowing directly into said pipes. A cap 25 is provided on the T 22 over said chimney. Curtains 26 are suspended from the chamber 11, inclosing the space beneath said chamber, which by reason of the radiation of heat from the pipe 15 and the said chamber and the discharge of the heated air therein will be warmer considerably than the chamber 6 on each side. An asbestos covering 15' is provided for the pipe 15. (See Figs. 2, 3, and 5.) This covering has its ends secured to the wall of the casing between the curtains 26. An opening 27 is provided in the chamber 11, through which a thermometer may be inserted to ascertain the temperature of the space inclosed by the curtain 26. A ventilating-port 28, adapted to be closed by a slide 29, is provided in the wall of the chamber 6, and the chamber 5 has a window 30.

In the operation of the device the lamp having been lighted circulation of air will commence through the space between the floor 8 and the plate 10 and around in the chamber beneath the said plate and through and beneath the chamber 11, entering the port 12 and mingling with the air from the pipe 15 and flowing around in the said chamber 11 and finally passing down through the holes 14 into the space inclosed by the curtain 26. The chickens are allowed to feed in the chamber 5, then pass through the curtain 7 into the chamber 6 and either enter the more highly heated space inclosed by the curtain 26 or remain on either side of the chamber 11, according to the temperature desired. The floor 8 being heated above and below will always be warm, and a large amount of heat will be radiated downward from the chamber 11 and through the holes 14 and supply the heat to the chickens from above, corresponding as nearly as possible to the natural heat of the mother hen. A suitable door 31 allows access to the lamp, and windows 32 in the front wall of the brooder permit its interior to be observed.

I claim as my invention—

1. The combination, of a suitable casing divided into a feeding and a heating chamber, a transverse vertical curtain separating said chambers, a floor provided in said heating-chamber and raised above the bottom of said casing and extending from the front wall of said casing to the lower edge of said curtain and having a suitable inclined plate leading into said feeding-chamber, a plate provided below said floor and spaced therefrom, a pipe extending through said floor and plate and having a series of perforations leading into the space between said floor and plate, and a lamp provided below said plate and a pipe and having its chimney extending up through said pipe, substantially as described.

2. In a brooder, the combination, with a casing, of a floor arranged therein, a box supported above said floor and having a cold-air-inlet port leading through the wall of said casing and provided with a series of holes leading into said casing, a lamp arranged beneath said floor and having its chimney extending up into said box, and waste-pipes for the foul air communicating with the upper end of said chimney, substantially as described.

3. In a brooder, the combination, with a casing, of a floor supported therein, a plate arranged beneath said floor and spaced therefrom, a box supported above said floor and having a port communicating with the open air and a series of holes leading into said casing, a pipe leading from the space beneath said floor to said box and having a series of perforations communicating with the space between said floor and plate, and a lamp having a chimney arranged within said pipe and provided with waste or foul-air tubes, substantially as described.

4. In a brooder, the combination, with a casing, of a floor arranged therein, a box horizontally supported above said floor and of less width than the width of said casing and floor and communicating with the open air and having a series of holes leading into the space between it and said floor, a lamp arranged beneath said floor and having a chimney projecting therethrough and up into said box, and a flexible curtain supported by said chamber and inclosing the space beneath the same on the sides and the inner end, substantially as described.

5. The combination with a brooder-casing, of a floor supported horizontally therein intermediate to its top and bottom, a plate arranged beneath said floor and spaced therefrom and from the bottom of said casing, a lamp arranged beneath said floor, a chimney for said lamp projecting upwardly through said plate and floor, and a pipe inclosing said chimney and having perforations communicating with the space between said plate and floor, substantially as described.

6. The combination, with a brooder-casing, of a floor arranged therein, a rectangular sheet-metal box supported above said floor and communicating with the open air and having a series of holes, a lamp provided beneath said floor, a chimney therefor projecting into said box, and waste or foul-air pipes extending horizontally from said box through the wall of said casing and having suitable guards or hoods, substantially as described.

7. The combination with a brooder-casing having a draft-opening and a floor dividing its interior into upper and lower chambers, and a plate beneath and spaced from said floor a lamp arranged beneath said floor near said opening, a chimney for said lamp projecting upwardly through said floor, and a pipe inclosing said chimney and having perforations communicating with the space between said floor and plate, substantially as described.

8. In a brooder, the combination with a casing, of a floor supported therein and spaced from the bottom of said casing, a box arranged within said casing and communicating with the open air and provided with a series of holes leading into said casing, a pipe extending through said floor from the space beneath the same and communicating with said box and having a series of perforations below said floor, and a lamp having a chimney arranged within said pipe and waste or foul-air tubes communicating with said chimney, substantially as described.

In witness whereof I have hereunto set my hand this 14th day of July, 1905.

JERRY G. HOFFKEN.

Witnesses:
RICHARD PAUL,
C. MACNAMARA.